United States Patent [19]

Amagi et al.

[11] E Re. 29,101

[45] Reissued Jan. 4, 1977

[54] METHOD FOR THE PREPARATION OF CARBON MOLDINGS AND ACTIVATED CARBON MOULDING THEREFROM

[75] Inventors: Yasuo Amagi; Yasushi Nishimura; Yasuo Uehara, all of Tokyo, Japan

[73] Assignees: Kureha Kagaku Kogyo Kabushiki Kaisha; Toyo Boseki Kabushiki Kaisha, both of Tokyo, Japan

[22] Filed: Mar. 18, 1976

[21] Appl. No.: 668,202

Related U.S. Patent Documents

Reissue of:

[64] Patent No.: 3,917,806
Issued: Nov. 4, 1975
Appl. No.: 401,160
Filed: Sept. 27, 1973

[30] Foreign Application Priority Data

Sept. 30, 1972 Japan ..... 47-97650

[52] U.S. Cl. ..... 423/449; 106/307; 252/421; 252/444; 252/445; 423/445; 264/29.1

[51] Int. Cl.[2] ..... C01B 31/02; C01B 31/10; B01J 21/18

[58] Field of Search ..... 252/421, 444, 445; 423/445, 447, 449; 264/29; 106/307

[56] References Cited

UNITED STATES PATENTS

| | | | |
|---|---|---|---|
| 3,403,093 | 9/1968 | Mills | 208/45 |
| 3,558,276 | 1/1971 | Otani et al. | 423/449 |
| 3,663,171 | 5/1972 | Granger | 252/421 |
| 3,668,110 | 6/1972 | Shea et al. | 208/45 |
| 3,775,344 | 11/1973 | Amagi et al. | 252/444 |
| 3,786,134 | 1/1974 | Amagi et al. | 423/449 |

*Primary Examiner*—Winston A. Douglas
*Assistant Examiner*—P. E. Konopka

[57] ABSTRACT

A method for the preparation of a porous carbon molding having a low apparent density, the method comprising the steps of thermally mixing a pitch, which has a softening point of 50° - 350° C, a carbon content of 80 - 97 wt%, a hydrogen/carbon ratio of 0.3-2.5 and a nitrobenzene-insoluble fraction of below 60 wt%, with at least one aromatic hydrocarbon having a boiling point of 200° C or higher, forming the mixture into a suitable shape, immersing the formed material in a solvent, in which the pitch is hardly soluble but the aromatic hydrocarbon is easily soluble, for extracting the aromatic hydrocarbon from the formed material and obtaining a porous pitch material, oxidizing the porous pitch material at a temperature from room temperature to 400° C by the use of an oxidizing agent to form an infusible porous pitch material, and calcining the infusible porous material in an inert atmosphere at a temperature higher than 600° C to obtain a porous carbon material. The porous carbon material or the infusible porous material may be activated by means of steam vapor or air to produce an activated carbon material.

10 Claims, No Drawings

METHOD FOR THE PREPARATION OF CARBON MOLDINGS AND ACTIVATED CARBON MOULDING THEREFROM

Matter enclosed in heavy brackets [ ] appears in the original patent but forms no part of this reissue specification; matter printed in italics indicates the additions made by reissue.

This invention relates to a novel method for the preparation of a carbon material and an activated carbon material, and more particularly to a method for the preparation of a spherical carbon material and a spherical activated carbon material.

BACKGROUND OF THE INVENTION

In general, activated carbon is broadly used, because of its excellent adsorbing property, as an agent for removing pollutants from air, water, etc., or purifying water or air. Activatd carbon when employed in the form of a sphere has many advantages. That is, spherical activated carbon can be readily transferred from one place to another due to its rolling property, and can also be easily filled uniformly in or discharged from a container or vessel in practical applications. Moreover, spherical activated carbon shows low resistance to a flow of gas or a liquid when applied in a packed bed. The same can be also employed even in a fluidized bed with easy handling. In addition, because of its spherical form, the spherical activated carbon is hardly broken into fragment during operation and almost free from abrasion losses which would occur in a material degree with other shapes.

While, spherical carbon moldings have also many applications other than in activated spherical carbons which have the above-mentioned advantages. For example, in case where carbon moldings in the form of a sphere is used for producing a composite material by mixing a metal (aluminum, copper, tin, etc.,) or a synthetic resin (a nylon, polyester, epoxy resin, fluororesin, etc.), the resultant composite material is remarkably improved in resistances to abrasion and surface-lubricating property, as compared with those using known carbon powder or granule, due to high mechanical strengths inherent to the spherical form and due to the uniformly mixing property of the spherical carbon with the metal or resin. Spherical carbon moldings are also useful as a filler in powder painting or as a starting material for producing isotropic graphite.

Spherical carbon moldings have been heretofore produced by mixing powdery carbon or carbon precurser with a binding agent and molding the mixture into a spherical form. The resultant spherical carbon moldings can be activated in a usual manner to form activated spherical carbon. In the prior molding method using powdered starting materials, however, it is very difficult to form fine spherical carbon moldings or activated carbon having a diameter of from several $\mu$ to 1 mm. The use of the powdered materials incurs reductions in operational efficiency and undesirable irregularities in shape. Accordingly, it is desired to provide a method which is capable of efficiently producing spherical carbon moldings and spherical activated carbon of better quality.

SUMMARY OF THE INVENTION

It is therefore an object of the present invention to provide a method for the preparation of porous spherical carbon moldings and porous spherical activated carbon moldings.

It is another object of the present invention to provide a method for the preparation of porous carbon moldings and porous activated carbon moldings having various shapes.

Other objects and advantages of the invention will become apparent from the following description.

According to the present invention, there is provided a method for the preparation of carbon moldings comprising the steps of mixing under heating conditions a pitch, which has a softening point of 50° – 350° C, a carbon content of 80 – 97 wt%, a hydrogen/carbon ratio of 0.3 – 2.5 and a nitrobenzene-insoluble fraction of below 60 wt%, with one or more of aromatic hydrocarbons having a boiling point of 200° C or higher, forming the mixture into a suitable shape, immersing the resultant moldings in a solvent, in which the pitch hardly soluble but the aromatic hydrocarbon is easily soluble, for extracting the aromatic hydrocarbon mainly from the moldings, oxidizing the resultant porous pitch moldings at a temperature from a normal temperature to 400° C by the use of an oxidizing agent to form an infusible pitch moldings, and calcining the resultant moldings in an inert atmosphere at a temperature higher than 600° C to obtain carbon moldings. The carbon moldings or the infusible pitch moldings may be activated by means of steam vapor or air to give activated carbon moldings. In this connection, where the mixture of the pitch with one or more aromatic hydrocarbons is molded into a spherical or other desired shape, there can, of course, be finally obtained carbon moldings or activated carbon moldings of a corresponding shape.

DETAILED DESCRIPTION OF THE INVENTION

The pitch useful in the present invention has a softening point of 50° – 350° C, a carbon content of 80 – 97 wt%, a hydrogen/carbon ratio of 0.3 – 2.5, and a nitrobenzene-insoluble fraction of less than 60 wt%. In practical applications, the pitch is preferred to have a softening point of 150 – 250° C, a carbon content of 85 – 97 wt%, a hydrogen/carbon ratio of 0.35 – 1.0 and a nitrobenzene-insoluble component of less than 60 wt%. In addition, the pitch is preferred not to contain elements other than hydrogen and carbon, more particularly, elements such as sulfur, halogens, metals and the like. If contained, such elements are desired to be in an amount smaller than 1 %. However, this is only a preferred condition but not an essential requirement in this invention. The starting pitch used in the present invention can be easily obtained, for example, by heat-treating a tar-like substance which is obtained as a by-product in thermal cracking of oils (including crude oils, naphtha, asphalt, heavy oil, light oil, kerosene oil, and the like) for the production of gaseous hydrocarbons, or a residual oil which is obtained in a petroleum refinery process, and removing low-boiling point components from the thus treated tar-like substance or residual oil by distillation, extraction or like operations. The pitch may be also obtained by removing low-boiling point components of coal tars. The pitch may be also obtained by removing low-boiling point components from residue which is obtained by thermal cracking of organic polymers (plastics) and the like. Thus, various kinds of materials including petroleum or coal-base materials can be used as a starting pitch material in the present invention.

While, the aromatic hydrocarbon to be added to the pitch is required to have a boiling point of 200° C or higher and good compatibility with the pitch. When mixed with the pitch, the aromatic hydrocarbon causes to lower the softening point and viscosity of the pitch to a certain degree, so that the mixture can be easily formed into a suitable shape. Examples of the aromatic hydrocarbons useful in the present invention include aromatic hydrocarbons having two or three rings such as naphthalene, methylnaphthalene, dimethylnaphthalene, anthrancene, phenanthrene, triphenylene, diphenyl, diphenylmethane, diphenylether and the like, and their alkyl derivatives. Though not critical, the ratio of the pitch to the aromatic hydrocarbons is preferred to be within a range 5 – 50, parts to 100 parts pitch by weight. The pitch is mixed with the aromatic hydrocarbons under heating conditions to form a fluidized mixture, and the mixture is then formed into a suitable shape by a known method. For example, in order to form the mixture into a spherical shape, it is dispersed to spheres in a suitable dispersing medium.

The thus formed material which is composed of the pitch and one or more aromatic hydrocarbons is then deprived of the aromatic hydrocarbon components mainly to produce a porous pitch material. That is, the formed material composed of the pitch and aromatic hydrocarbons is immersed in a solvent in which the pitch is hardly soluble but the aromatic hydrocarbons are easily soluble.

Examples of the solvent include an aliphatic hydrocarbon such as butane, pentane, hexane, heptane, or the like; a mixture mainly composed of aliphatic hydrocarbons such as naphtha, kerosene, or the like; and an aliphatic alcohol such as methanol, ethanol, propanol, butanol or the like. In accordance with the method of the present invention, when the formed material composed of the pitch and hydrocarbon is immersed in the above-mentioned solvent, the hydrocarbon can be extracted out of the formed material while maintaining the external shape of the material, thus forming a pitch material having porosity which is resulted from the extraction of the aromatic hydrocarbon. The porosity of the pitch material is advantageous in carrying out the following infusibilizing, carbonizing and activating processes in an efficient manner. That is, since the infusibilizing process involves a heterogeneous reaction between the solid pitch material and an oxidizable gas or liquid, the porosity of the solid pitch material allows the oxidizable gas or liquid to reach the inside of the pitch material easily for full and complete treatment thereof. Moreover, the release of decomposed gases in the carbonizing process and the diffusion of an activating gas into the inside of the porous pitch material can also be facilitated in the same manner as in the infusibilizing process.

It will be appreciated that an apparatus by which the formed material composed of the pitch and aromatic hydrocarbon is immersed in the above-mentioned solvent for forming a porous pitch material may be of any known type, and is not required to be of a particular type.

The thus obtained porous pitch material is oxidized by means of an oxidizing agent at a normal temperature to 400° C to obtain an infusible porous pitch material. The oxidizing agent is, for example, a gas such as $O_2$, $O_3$, $SO_3$, $NO_2$ or $Cl_2$, a mixed gas obtained by diluting any of the above-mentioned gases with air or nitrogen, or an oxidizing gas such as air, or an oxidizing liquid such as sulfuric acid, phosphoric acid, nitric acid a chromic acid aqueous solution or a permanganic acid aqueous solution. These oxidizing agents may be used singly or in combination.

In the infusibilizing step, the pitch material is preferred to be initially treated at a temperature lower than the softening point of pitch, while gradually raising the treating temperature, since the softening point is raised as the infusibilizing reaction proceeds, thus the infusibilizing time being shortened.

The thus treated infusible porous pitch material is then calcined in an inert atmosphere, for example, of nitrogen at a temperature higher than 600° C to produce a porous carbon material. When the thus produced carbon material or the infusible pitch material is activated by means of steam vapor or air activated porous carbon material can be readily obtained. The activation can be conducted by a known activation method. Additionally, where the infusible pitch material is subjected to activation, carbonization as well as activation occurs simultaneously.

A prominent feature of the carbon material of the present invention is that the carbon material is porous and has a reduced apparent density. Accordingly, the carbon material is considered useful as a starting material in certain cases. For example, where the carbon material is used in the form of fibre, its surface treatment can be made easier due to its porosity. Such porous fibre is useful as a starting material in the production of a composite material. Moreover, the porous carbon fibre activated by the use of steam vapor has various applications.

In addition, the carbon material of the present invention can be formed into any shape including a sphere, plate, rod or the like, and the thus formed carbon material can easily be activated, so that these carbon materials activated or not can find many applications.

The present invention will be particularly illustrated from the following examples, which are shown only by way of explanation, not limitation.

EXAMPLE 1

A tar-like material which was obtained by spraying for thermal cracking a Seria petroleum in steam vapor of 2000° C for 0.003 seconds of contact time and then rapidly cooled and distilled to remove therefrom distillates having a boiling point lower than 350° C (under a vacuum of 5 mmHg) to obtain a pitch. 75 kg of the thus obtained pitch (having a softening point of 198° C, a carbon content of 95 wt%, a hydrogen/carbon ratio of 0.6 and a nitrobenzene-insoluble fraction of 35 wt%), and 25 kg of naphthalene were introduced into an autoclave equipped with an agitator and having an inner volume of 400 l and mixed with each other at 160° C. Then, 200 kg of 0.2 % polyvinyl alcohol (having a saponification degree of 86 %) aqueous solution was added to the mixture for dispersing the mixture in the solution while agitating the resultant mixture at 150° C for 40 min at 300 r.p.m. The mixture was then cooled to obtain a slurry containing the pitch in the form of spheres. A major part of water was removed from the slurry, to which methanol was passed in an amount 6 times by weight as great as that of the spheres for removing naphthalene therefrom. Then, the spherical pitch which was dried in air contained naphthalene only in an amount less than 1 %. The spherical pitch was heated in a fluidized bed by means of heating air at from room temperature up to 300° C at a heating rate of 25° C/hr, and was maintained at a temperature of 300° C for 2 hours to obtain infusible pitch spheres. The infusible pitch spheres were heated in an atmosphere of nitrogen up to 1000° C at a heating rate of 200° C/hr, and were maintained at the temperature for 1 hour to yield porous carbon spheres having an average particle size of 450 $\mu$ and an almost true spherical form.

EXAMPLE 2

The infusibilized spherical pitches of Example 1 were activated, i.e., the pitches were heated by the use of a fluidized bed up to 900° C at a heating rate of 200° C/hr in an atmosphere of steam vapor and maintained at 900° C for 3 hours, thereby to obtain an activated spherical carbon.

The thus obtained activated spherical carbon had an average particle size in diameter of 400 $\mu$, an iodine adsorption number of 950 mg/l (when determined at an equilibrium concentration of 1 g/l), a caramel decoloration rate of 85 % (when determined in accordance with the method prescribed in Japanese Industrial Standards K-1470) and a surface area of 1100 $m^2/g$, thus showing high activity.

EXAMPLE 3

A vacuum distillation residual oil obtained from Kafji crude oil was introduced into a container of 410° – 420° C, into which heating steam vapor of 430° – 450° C was passed over 2 hours for a heat-treatment and distillation to obtain a pitch residue. 10 kg of the thus obtained pitch (having a softening point of 210° C, a carbon content of 84 wt%, a hydrogen/carbon ratio of 0.75, and a nitrobenzene-insoluble fraction of 27 wt%) and 2.5 kg of naphthalene were introduced into an autoclave having an inner volume of 20 l and equipped with an agitator and mixed with each other at 160° C. Then, the mixture was dropped into hexane from a nozzle having an inner diameter of 1 mm and provided at the bottom of the autoclave. In this connection, a cylindrical heating tube which had a length of 2 m and was maintained at 140° C was provided perpendicularly to the nozzle for preventing cooling of the mixture dropped. As a result, the mixture was formed into spheres having a diameter of about 2 mm. The spheres were gently agitated in hexane at room temperature for 3 hours for removing therefrom naphthalene by extraction. Then, the spheres were withdrawn from the hexane and dried to obtain pitch spheres containing only 2.5 % of naphthalene. The thus obtained pitch spheres were heated by means of heating air up to 300° C at a heating rate of 20° C/hr, and maintained at 300° C for 3 hours to obtain infusible pitch spheres. The pitch spheres were further heated in an atmosphere of nitrogen up to 1000° C at a heating rate of 200° C/hr, and maintained at the temperature for 1 hour to obtain porous carbon spheres. The carbon had an average particle size of 1.8 mm and an almost true spherical form.

EXAMPLE 4

The porous carbon spheres obtained in Example 3 were heated at 450° C in the air for 10 hours to obtain activated porous carbon spheres. The activated carbon spheres had an average particle size of 1.6 mm. an iodine adsorption number of 700 mg/g (when tested at an equilibrium concentration of 1 g/l), a caramel decoloration rate of 90 % (which was determined in accordance with the method prescribed in Japanese Industrial Standards K-1470) and a total surface area of 850 $m^2/g$, thus having high activity.

EXAMPLE 5

80 parts by weight of a pitch and 20 parts by weight of methylnaphthalene were thermally mixed with each other by the use of a small-scale test spinning machine. The pitch used was a residue obtained by reduced pressure distillation of a botton oil which was produced in the production of ethylene, and had a softening point of 180° C, a carbon content of 92 wt%, a hydrogen/carbon ratio of 0.84 and a nitrobenzene-insoluble fraction of 2 wt%. The mixture was spinned out together with an air flow through a nozzle having a diameter of 0.5 mm at a nozzle temperature of 130° C to form a filament. The filament was immersed in naphtha to remove therefrom methylnaphthalene to obtain a fibrous material composed substantially of the pitch. The fibrous material which was dried contained methylnaphthalene only in an amount less than 1 %. The fibrous pitch material was heated by means of heating air up to 300° C at a heating rate of 25° C/hr, and maintained at 300° C for 1 hour to obtain an infusible fibrous pitch mat. Then, the resultant fibre, was thermally treated in an atmosphere of nitrogen up to 1000° C at a heating rate of 300° C/hr and maintained at 1000° C for 1 hour to obtain a porous fibrous carbon material.

An average diameter of the single fibre was 15 $\mu$, its mechanical strength 6 $ton/cm^2$ and a modulus of 250 $ton/cm^2$.

EXAMPLE 6

The fibrous carbon material obtained in Example 5 was treated in an atmosphere of steam vapor of 850° C for 8 hours to obtain an activated fibrous carbon material. An average diameter of the single fibre was 12 $\mu$, an iodine adsorption number 830 mg/g (when determined at an equilibrium concentration of 1 g/l), a caramel decoloration rate of 83 % (when determined in accordance with the method prescribed in Japanese Industrial Standards K-1470), and a total surface area of 950 $m^2/g$, thus the fibrous activated carbon material having high activity.

EXAMPLE 7

A tar-like material which was obtained by thermally cracking Seria crube oil sprayed into steam vapor of 1200° C for a contacting time of 0.005 seconds and rapidly cooling the treated oil, was thermally treated at 400° C for 3 hours under a normal pressure and a distillate which had a boiling point lower than 380° C under a vacuum of 5 mmHg was removed from the tar-like material to obtain a pitch. 70 parts by weight of the thus obtained pitch (having a softening point of 220° C, a carbon content of 94 wt%, a hydrogen/carbon ratio of 0.65 and a nitrobenzene-insoluble fraction of 47 %) and 30 parts by weight of phenanthrene were thermally mixed with each other at 180° C and the mixture was introduced to a thickness of 1 cm in a metal mold having a size of 5 × 5 × 3 cm and cooled to form plate-like moldings. The moldings were immersed in heptane in an amount 15 times as great as the volume of the plate-like moldings while agitating heptane over 20 hours at room temperature for extracting phenanthracene from the moldings. The resultant moldings were heated by means of hot air from room temperature up to 300° C at a heating rate of 10° C/hr, and maintained at 300° C for 5 hours for obtaining an infusible plate-like pitch moldings. The resultant moldings were thermally treated in an atmosphere of nitrogen by heating it up to 1000° C at a heating rate of 50° C/hr and maintained at 1000° C for 3 hours to obtain a porous plate-like carbon moldings. The moldings had a compression strength of 550 kg/cm$^2$, a compression Young's modulus of $4 \times 10^4$ kg/cm$^2$, a specific resistance of 0.03Ω.cm and a bulk density of 1.7 g/cc.

EXAMPLE 8

The infusible plate-like pitch moldings obtained in Example 7 were heated in a mixed gas containing steam vapor and nitrogen in a ratio of 3 : 7 up to 900° C at a heating rate of 50° C/hr, and maintained at 900° C for 5 hours to give an activated porous plate-like carbon moldings. The resultant moldings had an iodine adsorption number of 750 mg/g (when determined at an equilibrium concentration of 1 g/l), a caramel decoloration rate of 80 % (when determined in accordance with the method prescribed in Japanese Industrial Standards K-1470) and a total surface area of 950 m$^2$/g, thus having high activity.

We claim:

1. A method of converting pitch into a formed porous carbon material, including the steps of forming pitch into shapes, oxidizing the formed shapes at a temperature of room temperature to 400° C to make the pitch infusible, and carbonizing the infusibilized shaped pitch in an inert atmosphere at a temperature higher than 600° C, wherein the improvement comprises the combination of steps of:

a. selecting a hydrocarbon pitch starting material having a softening point of 50°–350° C., a carbon content of 80–97, a hydrogen/carbon ratio of 0.3–2.5, and a nitrobenzene-insoluble fraction of less than 60%;

b. mixing said pitch starting material prior to said forming step with from 5 to 50 parts by weight of aromatic hydrocarbon per 100 parts of said pitch, said aromatic hydrocarbon being those having a boiling point of at least 200° C. and containing from 2 to 3 aromatic rings, said mixing being carried out with sufficient heating to form a fluidized mix which is subjected to said forming step to obtain said formed shapes; and c. contacting the thus-produced formed shapes with a liquid organic solvent in which said aromatic hydrocarbon is soluble, said solvent being further characterized by the property that said pitch is substantially insoluble therein, said contacting extracting said aromatic hydrocarbon to increase the porosity of said formed shapes prior to said steps of oxidizing and carbonizing thereof.

2. The method of claim 1 wherein said pitch is formed into particles of spherical shape.

3. The method of claim 1 wherein said aromatic hydrocarbon is selected from the group consisting of naphthalene, methylnaphthalene, dimethylnaphthalene, anthracene, phenanthrene, triphenylene, diphenyl, diphenylmethane, and diphenylether.

4. The method of claim 1 wherein said solvent is selected from the group consisting of butane, pentane, hexane, heptane, methanol, ethanol, propanol, butanol, naphtha, and kerosene.

5. The method of claim 1 wherein said aromatic hydrocarbon is naphthalene and said solvent is methanol.

6. The method of claim 1 in which said aromatic hydrocarbon is naphthalene and said solvent is hexane.

7. The method of claim 1 in which said aromatic hydrocarbon is methylnaphthalene and said solvent is naphtha.

8. The method of claim 1 in which said aromatic hydrocarbon is phenanthrene and said solvent is heptane.

9. A method of converting pitch into a formed porous carbon material, including the steps of forming pitch into shapes, oxidizing the formed shapes at a temperature of room temperature to 400° C to make the pitch infusible, and carbonizing the infusibilized shaped pitch in an inert atmosphere at a temperature higher than 600° C, wherein the improvement comprises the combination of steps of:

a. selecting a hydrocarbon pitch starting material having a softening point of 50°–350° C., a carbon content of 80–97, a hydrogen/carbon ratio of 0.3–2.5, and a nitrobenzene-insoluble fraction of less than 60%;

b. mixing said pitch starting material prior to said forming step with from 5 to 50 parts by weight of aromatic hydrocarbon per 100 parts of said pitch, said aromatic hydrocarbon being selected from the group consisting of naphthalene, methylnaphthalene, dimethylnaphthalene, anthracene, phenanthrene, triphenylene, diphenyl, diphenylmethane, and diphenylether, said mixing being carried out with sufficient heating to form a fluidized mix which is subjected to said forming step to obtain said formed shapes; and c. contacting the thus-formed shapes with a liquid organic solvent in which said aromatic hydrocarbon is soluble and said pitch is substantially insoluble, said solvent being selected from the group consisting of butane, pentane, hexane, heptane, methanol, ethanol, propanol, butanol, naphtha, and kerosene, said contacting extracting said aromatic hydrocarbon to increase the porosity of said formed shapes prior to said steps of oxidizing and carbonizing thereof.

10. The method of claim 9 wherein said pitch is formed into particles of spherical shape.

* * * * *